United States Patent
Haraguchi et al.

(10) Patent No.: US 9,871,267 B2
(45) Date of Patent: Jan. 16, 2018

(54) LAMINATED BATTERY AND MANUFACTURING METHOD THEREFOR

(71) Applicant: SANYO Electric Co., Ltd., Daito-shi, Osaka (JP)

(72) Inventors: Shin Haraguchi, Osaka (JP); Shinji Mino, Osaka (JP); Takayuki Shirane, Hyogo (JP); Tomoki Tsuji, Hyogo (JP)

(73) Assignee: SANYO Electric Co., Ltd., Daito-Shi (JP)

( * ) Notice: Subject to any disclaimer, the term of this patent is extended or adjusted under 35 U.S.C. 154(b) by 65 days.

(21) Appl. No.: 14/760,790

(22) PCT Filed: Jan. 20, 2014

(86) PCT No.: PCT/JP2014/000253
§ 371 (c)(1),
(2) Date: Jul. 14, 2015

(87) PCT Pub. No.: WO2014/112395
PCT Pub. Date: Jul. 24, 2014

(65) Prior Publication Data
US 2015/0333358 A1    Nov. 19, 2015

(30) Foreign Application Priority Data

Jan. 21, 2013  (JP) ................................ 2013-008057

(51) Int. Cl.
*H01M 10/04*   (2006.01)
*H01M 2/02*    (2006.01)
(Continued)

(52) U.S. Cl.
CPC ..... *H01M 10/0413* (2013.01); *H01M 2/0212* (2013.01); *H01M 2/0277* (2013.01);
(Continued)

(58) Field of Classification Search
CPC ......... H01M 10/0413; H01M 10/0436; H01M 10/045; H01M 2/0212; H01M 2/0277; H01M 2/08; H01M 2/1061
See application file for complete search history.

(56) References Cited

U.S. PATENT DOCUMENTS

| | | | | |
|---|---|---|---|---|
| 7,125,627 B2 * | 10/2006 | Gu | ...................... | H01M 2/0212 429/162 |
| 2007/0231683 A1 * | 10/2007 | Lee | ...................... | H01M 2/021 429/161 |
| 2012/0288746 A1 * | 11/2012 | Abe | .................... | H01M 2/0287 429/162 |

FOREIGN PATENT DOCUMENTS

| CN | 102195018 A | 9/2011 |
|---|---|---|
| JP | 61-29065 A | 2/1986 |

(Continued)

OTHER PUBLICATIONS

International Preliminary Report dated Jul. 21, 2015, Form PCT/IB/308 (Second and Supplementary Notice), Form PCT/IB326 and Form PCT/IB338 issued in counterpart International patent application No. PCT/JP2014/000253, with partial English translation. (14 pages).

(Continued)

*Primary Examiner* — Alix Eggerding
(74) *Attorney, Agent, or Firm* — Westerman, Hattori, Daniels & Adrian, LLP (57) ABSTRACT

A laminated battery provided with an electricity-producing element and an outer case. The electricity-producing element contains a positive electrode, a negative electrode, and an electrolyte. The outer case comprises two sheets of laminating film and includes the following: a containing section that contains the electricity-producing element; and a sealing section that is formed around the edge of the containing section by bonding the sheets of laminating film (Continued)

to each other. Corners are formed along the boundary between the containing section and the sealing section, and an adhesive resin layer in the sealing section is thicker in corner regions near the aforementioned corners than in other regions.

5 Claims, 4 Drawing Sheets

(51) Int. Cl.
  *H01M 2/08* (2006.01)
  *H01M 2/10* (2006.01)
(52) U.S. Cl.
  CPC ........... *H01M 2/08* (2013.01); *H01M 2/1061* (2013.01); *H01M 10/045* (2013.01); *H01M 10/0436* (2013.01); *Y10T 29/49115* (2015.01)

(56) References Cited

FOREIGN PATENT DOCUMENTS

| | | |
|---|---|---|
| JP | 2000-173559 A | 6/2000 |
| JP | 2000-182579 A | 6/2000 |
| JP | 2000-195476 A | 7/2000 |
| JP | 2001-52660 A | 2/2001 |
| JP | 2001-229889 A | 8/2001 |
| JP | 2004-55171 A | 2/2004 |
| JP | 2006-185713 A | 7/2006 |

OTHER PUBLICATIONS

International Search Report dated Feb. 25, 2014, issued in corresponding application No. PCT/JP2014/000253 (2 pages).

Office Acton and Search Report dated Oct. 9, 2016, issued in counterpart Chinese Patent Application No. 201480005394.8, with English translation. (8 pages).

* cited by examiner

LAMINATED BATTERY AND MANUFACTURING METHOD THEREFOR

TECHNICAL FIELD

The present invention relates to a laminated battery, and a manufacturing method thereof.

BACKGROUND ART

As an outer structure that stores a power generation element including a cathode, an anode, and an electrolyte, a so-called laminated battery which uses laminated films is known. For example, Patent Document 1 discloses a laminated battery having a recess in which a film member is accumulated at a portion of a sealing section of an outer film, at least where protruding sections of the cathode and the anode contact the film. The recess is formed along a longitudinal direction of the sealing section. Patent Document 2 discloses a laminated battery wherein, after a sealing section of an outer film is formed, the sealing section is embossprocessed, to provide protrusions and recesses.

RELATED ART REFERENCES

Patent Documents

[Patent Document 1] JP 2001-229889 A
[Patent Document 2] JP 2001-52660 A

DISCLOSURE OF INVENTION

Technical Problem

In a laminated battery, as described in the above-described Patent Documents, it is important to inhibit intrusion of moisture from the sealing section or the like. In addition, even when the internal pressure is increased such as when a high-pressure gas is generated from the power generation element due to high-temperature storage or the like, breakage of the sealing section must be prevented.

Solution to Problem

According to one aspect of the present invention, there is provided a laminated battery comprising: a power generation element having a cathode, an anode, and an electrolyte; and an outer structure formed by two laminated films each including an adhesive resin layer, the outer structure having a storage unit for the power generation element, and a sealing section formed at a periphery of the storage unit by joining the films, wherein a corner is formed at a boundary between the storage unit and the sealing section, and, in the sealing section, a thickness of the adhesive resin layer at a corner region proximate to the corner is greater than a thickness of the adhesive resin layer at the other regions.

According to another aspect of the present invention, there is provided a method of manufacturing a laminated battery having a power generation element having a cathode, an anode, and an electrolyte, and an outer structure formed by two laminated films each including an adhesive resin layer, the method comprising: a first step in which a depression that is to become a storage unit for the power generation element is formed through a drawing process and by pressing at least one of the laminated films with a pressing jig in which a through hole is formed; and a second step in which, after the power generation element is stored in the depression, a sealing section is formed at a periphery of the storage unit by joining the laminated films, wherein, in the first step, a load applied at a portion proximate to a corner of the through hole is set smaller than a load at the other portions when a load is applied to the pressing jig, to form a plurality of protrusions at a region, of a portion that is become the sealing section, proximate to a corner formed at a boundary with the depression, so that a thickness of the adhesive resin layer at the region is set greater than a thickness of the adhesive resin layer at the other regions.

Advantageous Effects of Invention

According to various aspects of the present invention, a laminated battery can be provided in which intrusion of moisture can be inhibited, and breakage of the sealing section can be inhibited even when the internal pressure is increased.

EMBODIMENT

A preferred embodiment of the present invention will now be described in detail with reference to the drawings.

The drawings referred to in the embodiment are schematically drawn, and the size ratios or the like of the constituting element drawn in the figures may differ from those of the actual device. The specific size ratios or the like should be determined in consideration of the following description.

Figure 1:
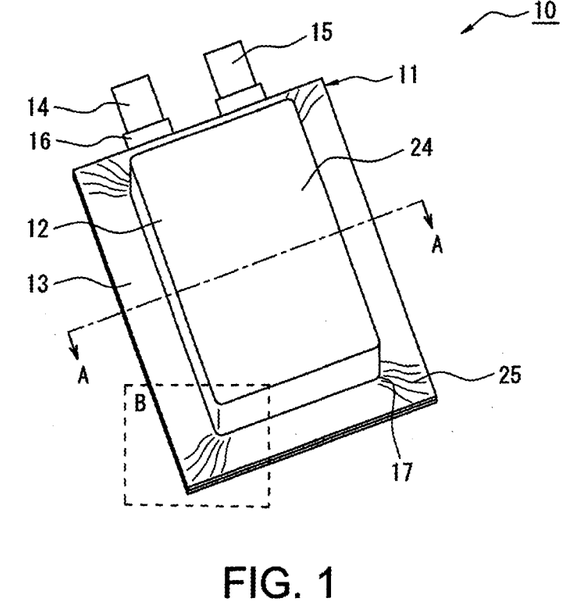
FIG. 1 is a perspective diagram showing a laminated battery according to a preferred embodiment of the present invention.
Figure 2:
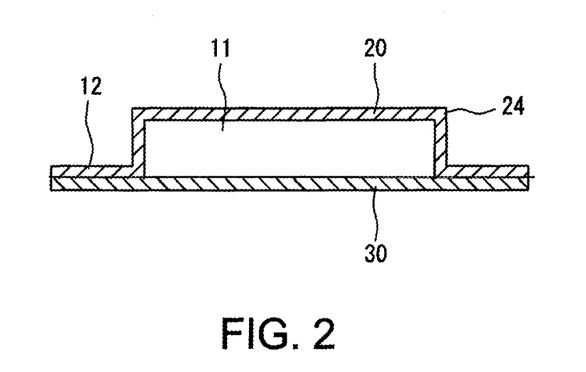
FIG. 2 is a cross sectional diagram along a line AA of FIG. 1.
Figure 3:
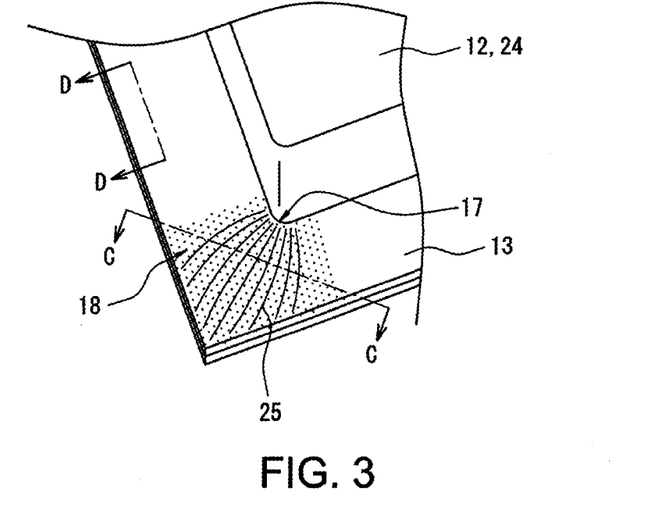
FIG. 3 is an enlarged view of a part B of FIG. 1.
Figure 4:
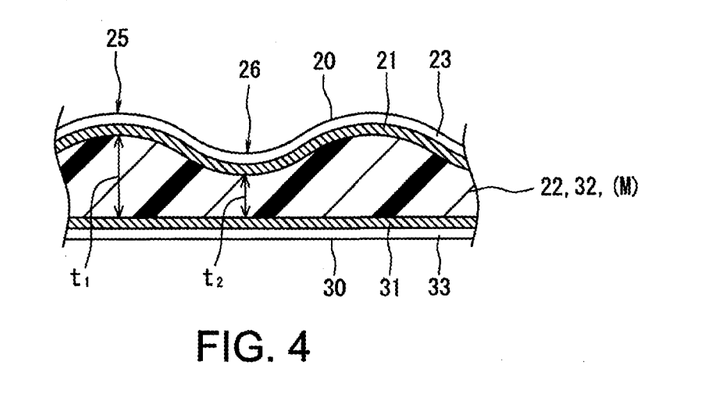
FIG. 4 is a cross sectional diagram along a line CC of FIG. 3.
Figure 5:
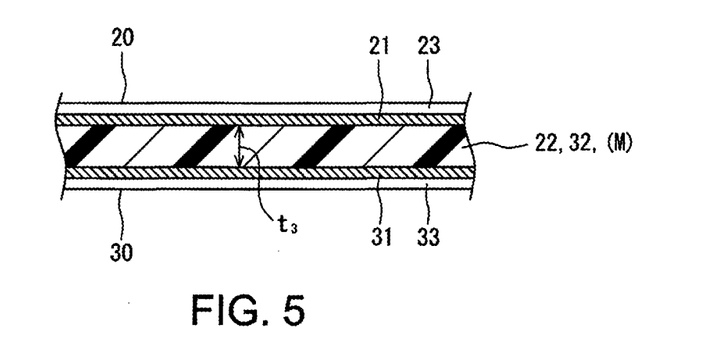
FIG. 5 is a cross sectional diagram along a line DD of FIG. 3.

With reference to FIGS. 1-5, a structure of a laminated battery 10 according to a preferred embodiment of the present invention will now be describe in detail. FIG. 3 is a diagram showing in an enlarged manner a region proximate to a corner 17 formed at a boundary between a storage unit 12 (recess-form processed section 24) and a sealing section 13. FIG. 4 is a cross sectional diagram (cross sectional diagram along a line CC of FIG. 3) of a corner region 18 which is a region, of the sealing section 13, proximate to the corner 17, and FIG. 5 is a cross sectional diagram (cross sectional diagram along a line DD of FIG. 3) of a region distanced from the corner region 18.

As shown in FIGS. 1 and 2, the laminated battery 10 comprises a power generation element (not shown) including a cathode, an anode, and an electrolyte, and an outer structure 11 formed by two laminated films 20 and 30. The power generation element is stored in an internal space of a storage unit 12 formed between the laminated films 20 and 30. In the outer structure 11, the laminated films 20 and 30 are joined to form a sealing section 13, so that the internal space in which the power generation element is stored is sealed.

No particular limitation is imposed on the shape of the laminated battery 10; that is, the shape of the outer structure 11, and, for example, an approximate rectangular shape in the planar view as shown in FIG. 1 may be employed. In the present specification, a "planar view" refers to a state viewed from a direction perpendicular to primary surfaces (surface having the largest area) of the laminated films 20 and 30. The sealing section 13 can be formed in a frame shape with an approximately uniform width along an end edge of the outer structure 11. A portion having an approximate rectangular shape in the planar view surrounded by the sealing section 13 is the storage unit 12. In the present embodiment, a boundary line between the storage unit 12 and the sealing section 13 is approximately parallel to an end side (outer shape line) of the outer structure 11.

In the laminated battery 10, a cathode lead 14 connected to the cathode and an anode lead 15 connected to the anode extend from the internal space of the storage unit 12 in which the power generation element is stored. The leads preferably extend from the same end side of the outer structure 11 and to be approximately parallel with each other. A resin film 16 is adhered to each lead, and, at the sealing section 13, the resin film 16 sandwiched between the laminated films 20 and 30 is welded to the adhesive resin layers of the films.

An example power generation element is formed by an electrode structure in which the cathode and the anode are wound with a separator therebetween, and a nonaqueous electrolyte. As the nonaqueous electrolyte, generally, a liquid electrolyte including a nonaqueous solvent and an electrolyte salt such as lithium salt dissolved in the nonaqueous solvent is employed, but alternatively, a solid electrolyte which uses a gel-form polymer or the like may be employed.

The cathode is formed by, for example, a cathode electricity-collecting structure such as a metal foil, and a cathode activation material layer formed over the cathode electricity-collecting structure. The cathode activation material layer preferably includes, in addition to a cathode activation material, a conductive member and a bonding agent. As the cathode activation material, a lithium-containing transition metal oxide containing a transition metal element such as Co, Mn, Ni, or the like may be exemplified.

The anode is formed by, for example, an anode electricity-collecting structure such as a metal foil, and an anode activation material layer formed over the anode electricity-collecting structure. The anode activation material layer preferably includes a bonding agent in addition to an anode activation material that can occlude and detach lithium ions. As the anode activation material, natural graphite, artificial graphite, lithium, silicon, carbon, tin, germanium, aluminum, lead, indium, gallium, and alloys and mixtures thereof may be exemplified.

As described above, the outer structure 11 functions as a container that stores the power generation element, and includes the storage unit 12 for the power generation element. The storage unit 12 is provided by forming an internal space which can store the power generation element, between the laminated films 20 and 30. In other words, a portion other than the sealing section 13 where the laminated films 20 and 30 are joined may become the storage unit 12. However, in the storage unit 12, preferably, a recess-form processed section 24 which is a depression which can store the power generation element is formed in advance on at least one of the laminated films 20 and 30. In the present embodiment, the recess-form processed section 24 having an approximately rectangular shape in the planar view is formed only on the laminated film 20.

The recess-form processed section 24 is formed in order to enlarge the internal space of the storage unit 12. The recess-form processed section 24 is formed by denting a side of a surface opposing the laminated film 30 at a center section of the laminated film 20, to a degree to allow storage of the power generation element. In other words, the center section of the laminated film 20 is expanded in a protruded shape toward the outside of the outer structure 11. As will be described below, the recess-shaped processed section 24 is preferably formed through a drawing process.

As described above, the outer structure 11 has the sealing section 13 formed by joining end edges of the laminated films 20 and 30. With this configuration, the internal space of the storage unit 12 storing the power generation element is sealed. The sealing section 13 is formed by overlapping the laminated films 20 and 30 in a manner such that adhesive resin layers 22 and 32 to be described later oppose each other, and thermally welding these layers.

The laminated films 20 and 30 forming the outer structure 11 preferably have metal layers 21 and 31, the adhesive resin layers 22 and 32, and outer-surface layers 23 and 33, respectively (refer to FIGS. 3 and 4). For the laminated films 20 and 30, the same type of films may be used. The items common to the laminated films 20 and 30 will be described with reference to the laminated film 20 as an example. The laminated film 20 may have layers other than the above-described layers. For example, a resin layer for improving adhesion characteristic or gas barrier characteristic may be provided between the metal layer 21 and the outer-surface layer 23. In addition, for usages that experience a small external impact, the outer-surface layer 23 is not needed, and thus, may be omitted.

The metal layer 21 has a function to prevent passing of moisture or the like, and is preferably formed by thin-film form aluminum. An aluminum layer can be formed using an aluminum foil or through aluminum deposition. No particular limitation is imposed on the thickness of the metal layer 21, which is preferably 20 µm~60 µm, and more preferably 30 µm~50 µm.

The adhesive resin layers 22 and 23 enable thermal welding of the laminated films 20 and 30. The adhesive resin layers 22 and 33 can be adhered to each other by being melted by heating, and, after the thermal welding, the adhesive resin layers 22 and 32 come inclose contact with each other to a degree in which the boundaries cannot be confirmed. In the following, the thermally welded adhesive resin layers 22 and 23 may be collectively referred to as an adhesive resin layer M. The adhesive resin layer 22 is preferably formed by an olefin-based resin such as a copolymer having polyethylene, polypropylene, and ethylene-propylene as primary constituents. No particular limitation is imposed on the thickness of the adhesive resin layer 22, which is thicker than the metal layer 21, and is preferably 30 µm~120 µm, more preferably 60 µm~100 µm.

The outer-surface layer 23 functions as a protection layer which prevents breakage, damages, and corrosion from occurring, for example, in the metal layer 21 or the like. The outer-surface layer 23 is preferably formed by a polyester-based resin such as polyethylene terephthalate (PET) or the like. No particular limitation is imposed on the thickness of the outer-surface layer 23, which is preferably 5 µm~30 µm, more preferably 10 µm~20 µm.

The outer structure 11 has the corner 17 at a boundary between the storage unit 12 and the sealing section 13. In the present embodiment, because the storage unit 12 has an approximately rectangular shape in the planar view, the boundary lines between the storage unit 12 and the sealing section 13 are four straight lines, and four corners 17 exist for the laminated film 20. The corner 17 may be formed in a right angle, but, because the stress when the internal pressure is increased tends to be applied on the corner 17, the corner 17 preferably has a rounded shape, from the viewpoint of reducing the stress load. In order to increase the volume of the storage unit 12, the corner 17 preferably has a radius of curvature less than or equal to 5 mm, and more preferably has a radius of curvature of about 1 mm~3 mm. As will be described in detail later, according to the laminated battery 10, even when the radius of curvature of the corner 17 is small, the breakage of the sealing section 13 when the internal pressure is increased can be sufficiently inhibited.

As shown in FIGS. 3-5, in the outer structure 11, of the sealing section 13, in a corner region 18 (dotted region in FIG. 3) proximate to the corner 17, the thickness of the adhesive resin layer M is greater than the thickness of the adhesive resin layer M in the other regions. Here, the corner region 18 refers to at least an area surrounded by two end sides of the outer structure 11 and two normals drawn from the corner 17 to end sides, and preferably refers to an area of a predetermined length along the longitudinal direction of the sealing section 13 from the corner 17 (area of about the same length as the width of the sealing section 13, for example), in addition to the above-described area.

In the corner region 18 of the sealing section 13, preferably, a plurality of protrusions 25 are formed. In the present embodiment, by providing the plurality of protrusions 25, the thickness of the adhesive resin layer M in the corner region 18 is set greater than the thickness of the adhesive resin layer M in the other regions. With such a configuration, the adhesion strength of the sealing section 13 can be improved efficiently, and the breakage can be prevented.

The plurality of protrusions 25 are formed in a string form from the side of the storage unit 12 toward the outside; that is, toward the end side of the outer structure 11. For example, a part of the protrusions 25 are formed approximately parallel to the width direction of the sealing section 13, and another part of the protrusions 25 are formed intersecting the width direction and the longitudinal direction of the sealing section 13. Preferably, at least three strings of the protrusions 25 are formed, and preferably, a plurality of recesses 26 are formed between the protrusions 25. In other words, in a direction perpendicular to the longitudinal direction of the protrusions 25, the plurality of protrusions 25 and the plurality of recesses 26 are alternately repeated, and in the corner region 18, a plurality of string-form recesses and protrusions are formed from the side of the storage unit 12 toward the outside.

In the present embodiment, the string-form recesses and protrusions are formed only on the laminated film 20. In the corner region 18, the string-form recesses and protrusions may be formed on both laminated films 20 and 30, but from the viewpoint of productivity or the like, preferably, the string-form recesses and protrusions are formed only on the laminated film 20 having the recess-form processed section 24.

In the protrusion 25, a thickness $t_1$ of the adhesive resin layer M is greater than a thickness $t_3$ of the adhesive resin layer M at the regions other than the corner region 18. Preferably, $t_1 \le t_3 \times 3$, more preferably, $t_3 \times 1.2 \le t_1 \le t_3 \times 2.7$, and even more preferably, $t_3*1.5 \le t_1 \le t_3 \times 2.5$. When the thickness $t_1$ is within these ranges, the sealing section 13 having a high joining strength can be formed without introducing air bubbles into the adhesive resin layer M, and it becomes easier to prevent breakage of the sealing section 13 at the corner region 18.

In the recess 26 also, preferably, a thickness $t_2$ of the adhesive resin layer M is greater than the thickness $t_3$ of the adhesive resin layer M in regions other than the corner region 18. The thickness $t_2$ is smaller than the thickness $t_1$, preferably, $t_3 < t_2 \le t_3 \times 2$, more preferably, $t_3 \times 1.05 \le t_2 \le t_3 \times 1.7$, and even more preferably, $t_3 \times 1.1 \le t_2 \le t_3 \times 1.5$. When the thickness $t_2$ is within these ranges, a sealing section 13 having a high joining strength can be formed.

A pitch between an adjacent protrusion 25 and recess 26 (spacing between a top of the protrusion 25 and a bottom of the recess 26) is preferably about 100 μm~1000 μm, more preferably about 150 μm~800 μm, and even more preferably, about 200 μm~600 μm.

Further, the string-form recesses and protrusions are preferably formed only in the corner region 18. By forming the string-form recesses and protrusions in a limited region; that is, the corner region 18, and setting the thickness of the adhesive resin layer M at the corner region 18 to be greater than the thickness of the adhesive resin layer M in the other regions, it becomes possible to efficiently prevent the breakage of the sealing section 13 while inhibiting intrusion of moisture. When the string-form recesses and protrusions are formed in a wide area of the sealing section 13 and the thickness of the adhesive resin layer M is set to be greater, an amount of passing moisture would increase, but a form, in which the string-form recesses and protrusions are formed in regions other than the corner region 18 in a range where the amount of passing moisture is not affected, may be considered equivalent to the present embodiment.

Next, with reference to FIG. 6, an example method of manufacturing the laminated battery 10 having the above-described structure will be described in detail. FIG. 7 exemplifies a method of manufacturing the laminated battery according to the related art, for a comparison purpose. Here, a difference from the manufacturing method of the related art will be described, and the explanation of the manufacturing method of the power generation element and the laminated film itself which are manufactured by methods known in the related art will be omitted.

A manufacturing process of the laminated battery 10 comprises a first step in which a recess-form processed section 24 is formed on one laminated film 20b of the outer structure 11 by a drawing process. As described above, the recess-form processed section 24 is a depression which forms the storage unit 12 for the power generation element; more specifically, a depression for increasing a volume of the storage unit 12. The manufacturing process of the laminated battery 10 further comprises a second step in which the sealing section 13 is formed at a periphery of the storage unit 12 by joining the laminated films 20 and 30 after the power generation element is stored in the recess-form processed section 24. As described above, the sealing section 13 is formed by overlapping and thermally welding the laminated films 20 and 30 in a manner such that the adhesive resin layers 22 and 32 oppose each other.

Figure 6:
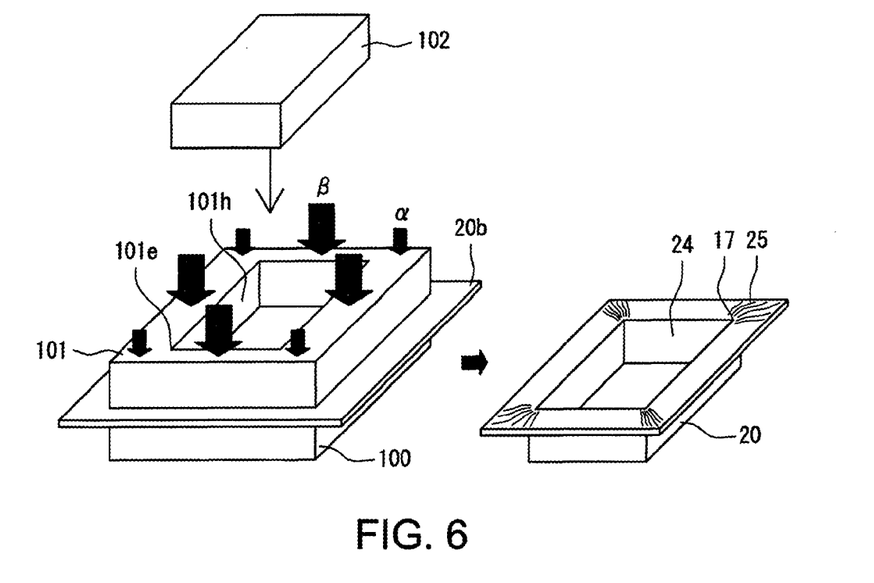
FIG. 6 is a diagram showing manufacturing steps of a laminated battery according to a preferred embodiment of the present invention.
Figure 7:
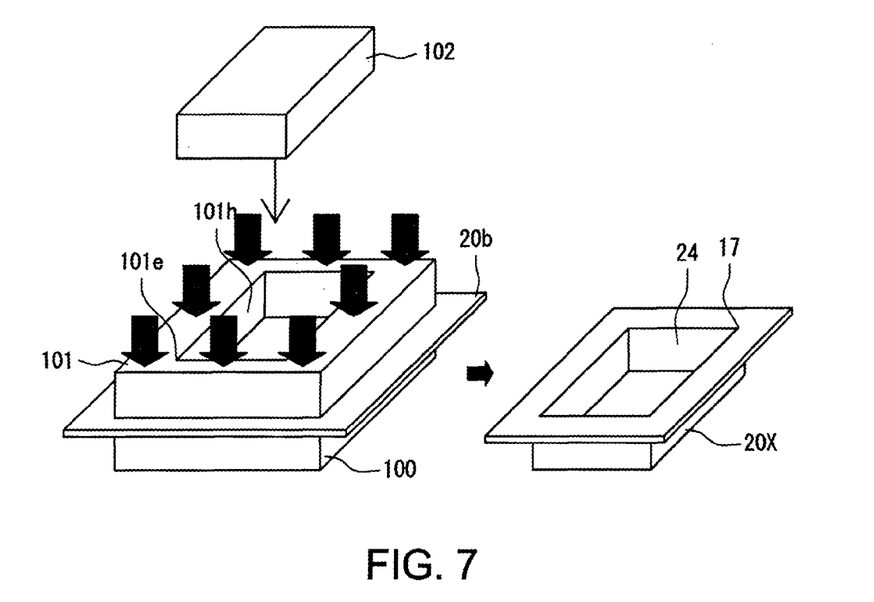
FIG. 7 is a diagram showing manufacturing steps of a laminated battery according to the related art.

FIG. 6 shows a drawing process step which is the first step. As shown in FIG. 6, in the drawing process step, a lower jig 100 called a dice, an upper jig 101 which holds the laminated film 20b which is the member to be processed, and a press die 102 are used, to form the recess-form processed section 24 on the laminated film 20b. On the lower jig 100 and the upper jig 101, through holes corresponding to the shape of the recess-form processed section 24 are formed, and the press die 102 is inserted into the hole, to process the laminated film 20b.

In the present step, first, the laminated film 20b is placed on the lower jig 100, and is fixed by holding with the upper jig 101. In this process, in the step of the related art shown in FIG. 7, the load to be applied to the upper jig 101 is set constant. On the other hand, in the present step, the load applied to the upper jig 101 is not set constant, and a load α at a portion proximate to a corner 101e of a through hole 101h is set smaller than a load β for the other portions. In this state, the press die 102 is press-inserted, to form the recess-form processed section 24. With this process, the recess-form processed section 24 is formed, and many string-form protrusions 25 are formed in the region which is to become the corner region 18, with the thickness of the adhesive resin layer 22 at the corner region being greater than the thickness of the adhesive resin layer 22 in the other regions. In the step of the related art shown in FIG. 7, a laminated film 20x is obtained which does not have the protrusion 25.

In other words, in the present step, with a simple operation of merely setting load α≤load β using the existing equipment, the laminated film 20 is intentionally bowed at the region to become the corner region 18, and many string-form protrusions 25 are formed. In addition, by bowing the laminated film 20 at the region to become the corner region 18, pinhole of the metal layer 21 is prevented. In the metal layer 21, a pinhole tends to occur by the corner at the bottom of the recess-form processed section 24 being broken, but according to the present step, the occurrence of the pinhole at this portion can be prevented.

As described, according to the laminated battery 10, string-form recesses and protrusions (protrusions 25 and recesses 26) are formed in the corner region 18 to set the thickness of the adhesive resin layer M at the corner region 18 greater than the thickness of the adhesive resin layer M at the other regions. Thus, it becomes possible to reduce the stress applied to the corner region 18 even when the internal pressure is increased due to generation of high-pressure gas or the like, and to prevent breakage of the sealing section 13 by the increase of the internal pressure. Further, by limiting the formation of the string-form recesses and protrusions to the corner region 18, it is possible to more efficiently prevent breakage of the sealing section 13 while inhibiting intrusion of moisture.

As shown in TABLE 1, in the laminated battery 10 (sample A1), the breakage of the sealing section 13 due to the increase of the internal pressure can be prevented even when the radius of curvature of the corner 17 is reduced. In other words, with the laminated battery 10, the radius of curvature of the corner 17 can be reduced, to increase the volume of the storage unit 12. Furthermore, in the laminated battery 10 (sample A1), the amount of passing moisture can be reduced.

TABLE 1

| | SUMMARY OF SAMPLE | R1 | R3 | AMOUNT OF PASSING MOISTURE |
|---|---|---|---|---|
| SAMPLE A1 | STRING-FORM RECESSES AND PROTRUSIONS (PROTRUSIONS 25 AND RECESSES 26) FORMED ONLY AT CORNER REGION 18 AVERAGE THICKNESS OF ADHESIVE RESIN LAYER M PROTRUSION 25; 160 μm RECESS 26; 88 μm REGIONS OTHER THAN CORNER REGION; 72 μm | ○ | ○ | 36.7 ppm |
| SAMPLE B1 | NO RECESS OR PROTRUSION AT SEALING SECTION UNIFORM THICKNESS (AVERAGE 73 μm) OF ADHESIVE RESIN LAYER M OVER ENTIRE REGION OF SEALING SECTION | X | ○ | 33.0 ppm |
| SAMPLE B2 | NO RECESS OR PROTRUSION AT SEALING SECTION UNIFORM THICKNESS (AVERAGE 161 μm) OF ADHESIVE RESIN LAYER M OVER ENTIRE REGION OF SEALING SECTION | ○ | ○ | 72.3 ppm |
| SAMPLE B3 | RECESSES AND PROTRUSIONS SIMILAR TO SAMPLE 1 FORMED OVER ENTIRE REGION OF SEALING SECTION | ○ | ○ | 44.1 ppm |
| SAMPLE B4 | RECESSES AND PROTRUSIONS FORMED ALONG LONGITUDINAL DIRECTION OF SEALING SECTION OVER ENTIRE REGION OF SEALING SECTION PROTRUSION; 162 μm RECESS; 72 μm | X | ○ | — |

Each sample was manufactured by sealing only air in the storage unit and such that the outer sizes were identical, as described below, and a pressurization test was applied. In addition, samples were manufactured in which only the nonaqueous electrolytic solution was stored in the storage unit, and the moisture passing characteristic was evaluated based on an amount of moisture in the electrolytic solution.

Figure 8:
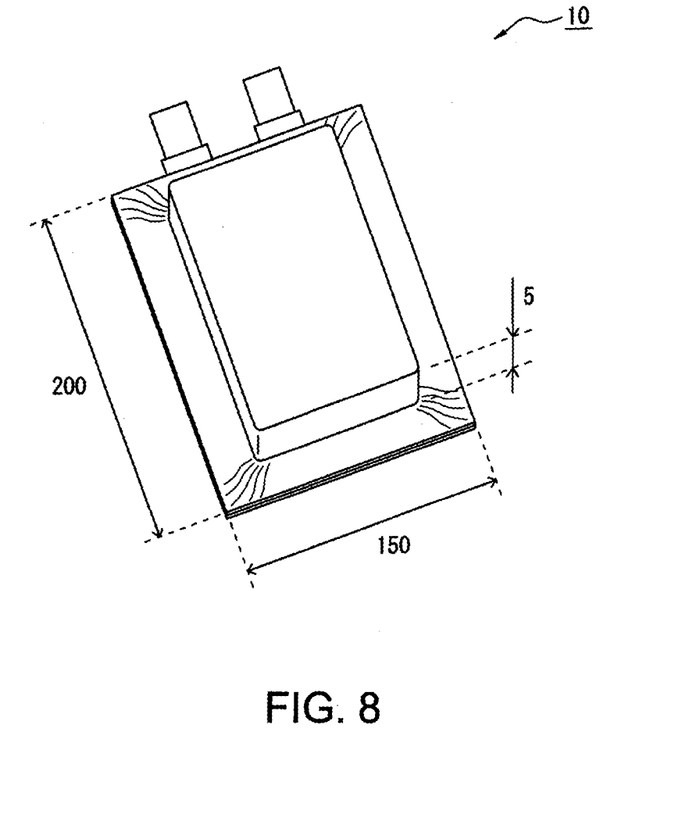
FIG. 8 is a diagram showing sizes of the laminated battery of FIG. 1.

Storage Element; Air (120 cc), nonaqueous electrolytic solution: propylene carbonate Outer Sizes; As described in FIG. 8

Layering Structure of Laminated Films; PET film (12 μm)/dry lamination adhesive layer (3 μm)/drawn nylon (15 μm)/dry lamination adhesive layer (3 μm)/aluminum layer (40 μm)/modified polypropylene and polypropylene (80 μm; adhesive resin layer)

R1; Radius of Curvature of Corner 17: 1 mm
R2; Radius of Curvature of Corner 17: 3 m
○; No breakage of sealing section when storage unit is pressed with 0.8 MPa
X; Breakage of sealing section when storage unit is pressed with 0.8 MPa
Amount of Passing Moisture; Amount of moisture in nonaqueous electrolytic solution when stored for 14 days under an environment of 60° C. and 90% RH.

EXPLANATION OF REFERENCE NUMERALS

10 LAMINATED BATTERY; 11 OUTER STRUCTURE; 12 STORAGE UNIT; 13 SEALING SECTION; 14 CATHODE LEAD; 15 ANODE LEAD; 16 RESIN FILM; 17 CORNER; 18 CORNER REGION; 20, 30 LAMINATED FILM; 21, 31 METAL LAYER; 22, 32 ADHESIVE RESIN LAYER; 23, 33 OUTER-SURFACE LAYER; 24 RECESS-FORM PROCESSED SECTION; 25 PROTRUSION; 26 RECESS; 100 LOWER JIG; 101 UPPER JIG; 102 PRESS DIE

The invention claimed is:

1. A laminated battery comprising:
   a power generation element having a cathode, an anode, and an electrolyte; and
   an outer structure formed by two laminated films each including an adhesive resin layer, the outer structure having a storage unit for the power generation element, and a sealing section formed at a periphery of the storage unit by joining the films, wherein
   a corner is formed at a boundary between the storage unit and the sealing section,
   in the sealing section, a thickness of the adhesive resin layer in a direction perpendicular to an adhesive surface of the adhesive resin layer at a corner region proximate the corner is greater than a thickness of the adhesive resin layer in the direction perpendicular to the adhesive surface of the adhesive resin layer at the other regions, and
   a portion of the adhesive resin layer having the greater thickness is formed to surround the corner,
   wherein in the corner region of the sealing section, a plurality of protrusions are formed on at least one of the laminated films,
   wherein each of the protrusions is formed in a string form from a side of the storage unit toward the outside.

2. The laminated battery according to claim 1, wherein
   the storage unit is provided by forming in advance a depression that can store the power generation element on one of the laminated films, and
   the protrusion is formed only on the laminated film having the depression.

3. The laminated battery according to claim 1, wherein
   a thickness of the adhesive resin layer in the direction perpendicular to the adhesive surface of the adhesive resin layer at a recess positioned between the protrusions is greater than a thickness of the adhesive resin layer in the direction perpendicular to the adhesive surface of the adhesive resin layer at the other regions.

4. The laminated battery according to claim 1, wherein
   a thickness of the adhesive resin layer in the direction perpendicular to the adhesive surface of the adhesive resin layer at the protrusion is less than or equal to three times the thickness of the adhesive resin layer in the direction perpendicular to the adhesive surface of the adhesive resin layer at the other regions.

5. A method of manufacturing a laminated battery having a power generation element having a cathode, an anode, and an electrolyte, and an outer structure formed by two laminated films each including an adhesive resin layer, the method comprising:
   a first step in which a depression that becomes a storage unit for the power generation element is formed through a drawing process and by pressing at least one of the laminated films with a pressing jig in which a through hole is formed; and
   a second step in which, after the power generation element is stored in the depression, a sealing section is formed at a periphery of the storage unit by joining the laminated films, wherein
   in the first step, a load applied at a portion proximate a corner of the through hole is set smaller than a load at the other portions when a load is applied to the pressing jig, to form a plurality of protrusions at a region, of a portion that becomes the sealing section, proximate a corner formed at a boundary with the depression, so that a thickness of the adhesive resin layer in a direction perpendicular to an adhesive surface of the adhesive layer at the region is set greater than a thickness of the adhesive resin layer in the direction perpendicular to the adhesive surface of the adhesive layer at the other regions and a portion of the adhesive layer having the greater thickness is formed to surround the corner,
   wherein the plurality of protrusions are formed on at least one of the laminated films,
   wherein each of the protrusions is formed in a string form from a side of the storage unit toward the outside.

* * * * *